United States Patent [19]

Masuoka et al.

[11] Patent Number: 4,898,895
[45] Date of Patent: Feb. 6, 1990

[54] ANTIFOULING PAIN HAVING A POLYACRYLATE COMPONENT WITH PENDENT SILYL OR SILOXANE GROUPS

[75] Inventors: Shigeru Masuoka; Hiroshi Doi, both of Hyogo; Yoshihiro Honda, Osaka, all of Japan

[73] Assignee: Nippon Oil and Fats Co., Ltd., Tokyo, Japan

[21] Appl. No.: 139,541

[22] Filed: Dec. 30, 1987

[30] Foreign Application Priority Data

Dec. 30, 1986 [JP] Japan .................................. 61-311221
Jun. 28, 1987 [JP] Japan .................................. 62-160089

[51] Int. Cl.$^4$ .................. C08F 30/08; C08L 31/00; C08L 31/02; C09D 5/14
[52] U.S. Cl. .................................. 523/122; 523/177; 106/15.05 16; 524/544; 524/547; 524/551; 524/555; 524/558; 427/385.5; 427/388.2; 526/279
[58] Field of Search .................. 523/122, 177; 106/15.05, 16; 524/544, 547, 551, 555, 558; 427/385.5, 388.2

[56] References Cited

U.S. PATENT DOCUMENTS

| | | | |
|---|---|---|---|
| 2,793,223 | 5/1957 | Merker | 526/279 |
| 3,548,025 | 12/1970 | Koerner | 526/279 |
| 3,577,264 | 5/1971 | Nordstrom | 526/279 |
| 4,052,354 | 10/1977 | Beiter et al. | 523/122 |
| 4,575,546 | 3/1986 | Klemarczyk et al. | 525/284 |
| 4,593,055 | 6/1986 | Gitlitz et al. | 106/16 |
| 4,594,365 | 6/1986 | Russell et al. | 106/15.05 |
| 4,670,481 | 6/1987 | Foscante et al. | 524/432 |
| 4,687,792 | 8/1987 | Russell et al. | 524/178 |
| 4,752,629 | 6/1988 | Proudlock et al. | 523/122 |

Primary Examiner—John Kight
Assistant Examiner—Frederick Krass
Attorney, Agent, or Firm—Sughrue, Mion, Zinn, Macpeak & Seas

[57] ABSTRACT

An antifouling paint is described, that contains as its essential components an antifoulant and a polymer of one or more of the monomers A represented by general formula (1) and/or copolymer composed of one or more of the monomers A and one or mroe vinyl polymerizable monomers B that are copolymerizable with said monomer A:

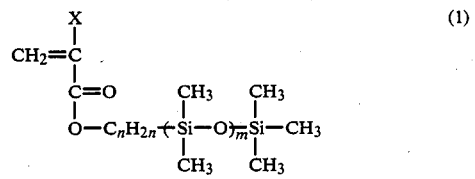

wherein X is a hydrogen atom or a methyl group; n is an integer of 2 to 4; and m signifies the average degree of polymerization and is zero or a real number. The antifouling paint may contain a slipping agent as the third essential component to provide an even greater fouling resistance.

6 Claims, 1 Drawing Sheet

ANTIFOULING PAIN HAVING A POLYACRYLATE COMPONENT WITH PENDENT SILYL OR SILOXANE GROUPS

FIELD OF THE INVENTION

The present invention relates to an antifouling paint that contains a polymer having polydimethylsiloxane groups and/or trimethylsilyl groups in side chains.

BACKGROUND OF THE INVENTION

Ship bottoms, buoys, fishing nets (e.g., nets for cultivating young yellowtail, scallops, etc., and stationary nets for catching salmon), and other structures submerged in seawater such as marine antifouling sheets and cooling water intake or discharge pipes are infested with organisms such as barnacles, tube worms and algae that attach to the surfaces of these structures and cause various troubles. It is routine practice to prevent the attachment of these marine fouling organisms by coating the surfaces of the aforementioned items with antifouling paints. Antifouling paints are roughly divided into the following two classes.

(A) An antifouling paint that employs antifoulants such as organotin copolymers and cuprous oxide that are capable of preventing the attachment of fouling organisms and have low solubility in seawater. Paints that employ organotin compounds as antifoulants are shown in Japanese Patent Publication Nos. 21426/65, 9579/69, 13392/71, 20491/74, 11647/76 and 48170/77.

(B) An antifouling paint that does not employ any antifoulants and which will not dissolve in seawater; instead, it uses silicone rubbers that cure by the action of a catalyst or moisture to form a crosslinked film For instance, an antifouling paint that uses a curable silicone rubber as a coating agent is shown in Japanese Patent Publication No. 35974/78. An antifouling paint that uses a mixture of a silicone oil and an oligomer-like silicone rubber having a terminal hydroxyl group is shown in Japanese Patent Application (OPI) No. 96830/76 (the term "OPI" as used herein refers to a "published unexamined Japanese patent application"). A mixture of a curable silicone rubber and a flowable organic compound that does not contain a metal or silicon is shown in Japanese Patent Application (OPI) No. 79980/78. A paint that serves to prevent the attachment of fouling marine organisms is also shown in Japanese Patent Publication No. 3433/85 and this paint is composed of a mixture of an oligomer-like low temperature curing silicone rubber (such as those available from Shin-Etsu Chemical Co., Ltd. under the trade names of "KE 45 TS" and "KE 44 RTV") and liquid paraffin or petrolatum.

These known antifouling paints exhibit characteristic performance depending upon their type and have been used in applications that suit specific object. However, these paints have the following problems to be solved.

The antifouling paints of class (A) are further divided into two subclasses. In one subclass of such antifouling paints, the film-forming resin does not dissolve in seawater and only the antifoulant dissolves in seawater to prevent the attachment of marine organisms. The paint films formed from this class of antifouling paints exhibit the intended effect during the initial period of application but after the antifoulant on the surface of the film is lost as a result of its dissolution in seawater, the antifoulant in the interior of the film will gradually dissolve. However, the dissolution rate of the antifoulant decreases as the depth of the area of the paint film in which the antifoulant is present increases, and the antifouling effect of the film will diminish with time.

In the second subclass of antifouling paints of class (A), both the antifoulant and the film-forming resin dissolve in seawater. The antifouling effect is achieved solely by the antifoulant or by a combination of the antifoulant and the resin component (e.g., an organotin copolymer) and, in either case, the surface of the paint film dissolves in seawater, continuously providing the antifouling paint film with an active surface. Therefore, the film formed from this type of antifouling paints is capable of maintaining the desired antifouling effect over a longer period than the aforementioned first subclass of paints (A). However, the effect of this type of antifouling paints is not completely satisfactory because the paint film they form is consumed fairly rapidly.

Antifouling paints of class (B) are designed to prevent the attachment of marine organisms by making use of the slipping property (low surface energy) of the silicone rubber coating. These antifouling paints have the advantage that they do not contain any component that will dissolve in seawater to cause its pollution as do antifouling paints of class (A). However, the mechanism of film formation from these paints involves the crosslinking of silicone rubbers after paint application and presents the following problems.

The first problem is associated with the curing of the film of the applied paint. For instance, when an antifouling paint of the type described in Japanese Patent Publication No. 3433/85 that employs a low temperature curing oligomer like silicone rubber that cures by the action of moisture in air to form a paint film is applied to a substrate, the crosslinking agent incorporated to control the curing condensation reaction of the silicone rubber is activated by the moisture or temperature of air to cause premature curing of the surface of the paint film. This retards the curing of the interior portion of the paint film to produce an insufficiently cured film which is most likely to blister or separate from the substrate. Furthermore, the slow penetration of moisture into the bulk of the film prolongs the time required to achieve its complete curing.

If the antifouling paint of the type described above is applied in a hot and humid atmosphere, the hydrolysis of the crosslinking agent predominates over the crosslinking reaction and the resulting paint film does not have a sufficient crosslinking density to provide satisfactory properties.

In a dry climate, the amount of aerial moisture is too small to cause hydrolysis of the crosslinking agent and the applied paint will cure very slowly. In order to avoid this problem, catalysts such as tin compounds and platinum are sometimes used as curing accelerators but their effectiveness is limited in cold climates.

The second problem concerns topcoating. In the usual case, the solvent in a paint for topcoating slightly softens the surface of the undercoat to ensure good intercoat bonding. However, in the application of the antifouling paint under consideration, the silicone rubber in the first applied coating cures to such an extent that the solvent in a paint for topcoating is not capable of softening the surface of the silicone rubber to provide satisfactory intercoat bonding.

The third problem is related to pot life. In practice, the length of coating operations may be extended beyond the scheduled period of time if the item to be treated is large in size or has a complex structure. In addition, the operation may be interrupted by unexpected rainfall or increase in the humidity of the air. In these cases, the paint which has been stirred in an open container must be left to stand until the surface of the substrate becomes sufficiently dry to warrant continued application of paint. In view of these possibilities, antifouling paints having short pot lives present great inconvenience in coating operations.

The fourth problem is associated with storage stability. Antifouling paints, after being prepared, are stored until use and the duration of such storage sometimes extends for a long period. Therefore, the manufacture of paints that will cure by the action of moisture necessitates the filling of their containers with a dry nitrogen gas. In addition, once the container is opened, aerial moisture will get in to cause curing of the surface of the paint or an increase in its viscosity. Paint that has undergone such changes is no longer suitable for use.

SUMMARY OF THE INVENTION

The present inventors conducted intensive studies in order to solve the aforementioned problems of prior art antifouling paint systems. As a result, the present inventors have succeeded in preparing an antifouling paint that employs an antifoulant in combination with a certain polymer that dries upon solvent evaporation and which is free from all of the defects of the known antifouling paints of class (B) which employ a silicone rubber either alone or in combination with a silicone oil or paraffin. The polymer produces a coating surface that has a small enough angle of slip to exhibit better antifouling effects than paints of class (B). In addition, this polymer is anticipated to display even better antifouling effects than known antifouling paints of class (A) which employ organotin copolymers as antifoulants. The present inventors have also found that a further improved antifouling paint can be produced by incorporating a slipping agent in the combined system of the polymer and an antifoulant.

Therefore, the first aspect of the present invention is to provide an antifouling paint that contains as its essential components an antifoulant and a polymer of one or more of the monomers A represented by general formula (1) and/or a copolymer which is composed of one or more of the monomers A and one or more vinyl polymerizable monomers B that are copolymerizable with said monomer A:

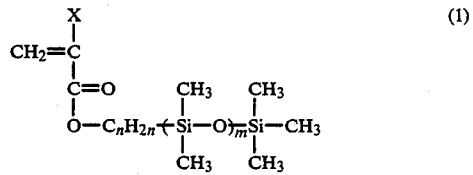
(1)

wherein X is a hydrogen atom or a methyl group; n is an integer of 2 to 4; and m signifies the average degree of polymerization and is zero or a real number.

The second aspect of the present invention is to provide an antifouling paint that contains a slipping agent as an essential component in addition to the above-defined polymer and/or copolymer and an antifoulant.

DETAILED DESCRIPTION OF THE INVENTION

Figure 1A:
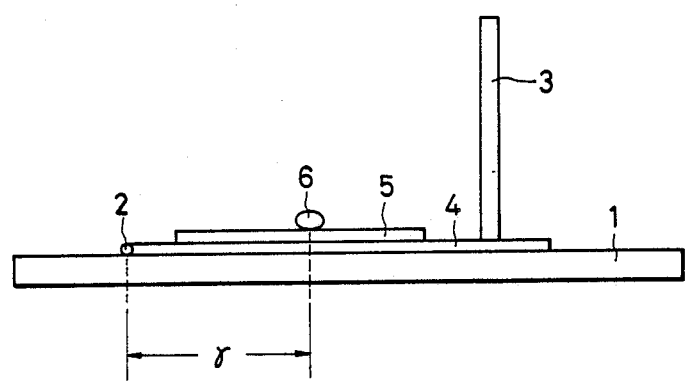
FIGS. 1(A) and 1(B) are side views showing how to measure the slip angle of the surface of an antifouling paint film.

In either aspect of the present invention, the antifouling paint contains as one of its components a homopolymer of monomer A represented by the above-noted general formula (1) or a copolymer of two or more of such monomers A (the homopolymer and copolymer are hereinafter collectively referred to as polymer A), or a copolymer which is composed of one or more of the monomers A and one or more vinyl polymerizable monomers B that are copolymerizable with said monomer A (said copolymer is hereinafter designated as copolymer AB). Polymer A may be used in combination with copolymer AB as required.

Polymer A and copolymer AB impart high slipping effects to the film formed from a paint that contains an antifoulant in combination with polymer A and/or copolymer AB or a paint that further contains a slipping agent. The films of these paints either by themselves or by incorporating an antifoulant will prove effective in preventing marine organisms from attaching to the surfaces of structures placed in seawater. The present inventors found that as will be shown in the Examples later in this specification, the effectiveness of the antifouling paint of the present invention against attachment of marine organisms was significantly great as compared with the already described prior art antifouling paint systems.

Both polymer A and copolymer AB are easily soluble in organic solvents, so if a paint containing one or both of them in combination with an antifoulant, optionally in the presence of a slipping agent, is dissolved in a solvent and applied to the surface of an item to be submerged in seawater, a uniform paint film can be readily formed by simply drying the applied paint. Furthermore, unlike silicone rubbers which cure upon chemical reactions that occur after application, polymer A and copolymer AB are essentially non-reactive and the film formed of the paint containing them is insensitive to both aerial moisture and temperature. In addition, a solution of this paint in a solvent has an extended pot life and better storage stability. In case of topcoating this film with a film of the same or different type, the undercoat is softened by the solvent used in the topcoat, thereby resulting in an excellent intercoat bonding. In other words, all of the problems associated with the conventional antifouling paint systems can be solved by employing polymer A or copolymer AB.

Monomer A used in the present invention for preparing polymer A or copolymer AB which affords the advantages described above is an unsaturated carboxylic acid monoester represented by general formula (1) which has a polydimethylsiloxane group ($m \geq 1$) or a trimethylsilyl group ($m=0$) in the molecule. In formula (1), m is zero or a real number which is typically up to about 5,000. In formula (1), n is specified to be within the range of 2 to 4. If n is less than 2, the linkage at the ester-forming portion of monomer A becomes weak and during polymerization or during the use of the resulting paint the ester linkage dissociates to either reduce the antifouling effect of the paint film or shorten the duration of time during which it exhibits the intended antifouling effect. If n is more than 4, the polymer becomes too soft to form a satisfactory film.

Examples of the monomer A represented by formula (1) are hereinafter listed by their specific names: illustrative compounds having a trimethylsilyl group include trimethylsilylethyl acrylate or methacrylate, trimethylsilylpropyl acrylate or methacrylate, and trimethylsilylbutyl acrylate or methacrylate; illustrative compounds having a polydimethylsiloxane group include polydimethylsiloxanethyl acrylate or methacrylate, polydimethylsiloxanepropyl acrylate or methacrylate, and polydimethylsiloxanebutyl acrylate or methacrylate.

These compounds as examples of monomer A are readily available commercially or can be obtained by synthesis. Exemplary methods of synthesis include: a method wherein acrylic acid or methacrylic acid is reacted with an alkylene glycol to form a corresponding ester, which then is condensed with a trimethylsilyl or polydimethylsiloxane compound; and a method wherein an ester of acrylic or methacyrlic acid with an allyl alcohol is subjected to an addition reaction with a trimethylsilyl or polydimethylsiloxane compound.

Monomer A may be copolymerized with a vinyl polymerizable monomer B to form copolymer AB, and illustrative compounds that can be used as monomer B include: methacrylate esters such as methyl methacrylate, ethyl methacrylate, butyl methacrylate, 2-ethylhexyl methacrylate, and 2-hydroxyethyl methacrylate; acrylate esters such as ethyl acrylate, butyl acrylate, 2-ehtylhexyl acrylate, and 2-hydroxyethyl acrylate; maleate esters such as dimethyl maleate and diethyl maleate; fumarate esters such as dimethyl fumarate and diethyl fumarate; and styrene, vinyltoluene, α-methylstyrene, vinyl chloride, vinyl acetate, butadiene, acrylamide, acrylonitrile, methacrylic acid, acrylic acid and maleic acid.

Vinyl polymerizable monomer B serves as a modifying component that imparts desirable properties to the antifouling paint; this monomer is also useful for the purpose of obtaining a polymer that has a higher molecular weight than the homopolymer of monomer A. The amount of monomer B used is appropriately determined in consideration of the properties it imparts and the antifouling effect achieved by monomer A. Generally, the proportion of monomer B is not more than 95 wt%, preferably not more than 90 wt%, of the total amounts of monomer A and monomer B. The reason for selecting this range is that if the proportion of monomer A in copolymer AB is at least 5 wt%, especially at least 10 wt%, the intended antifouling effect can be satisfactorily achieved by monomer A.

Polymer A and copolymer AB may be formed by polymerizing monomer A alone and in combination with monomer B, respectively, in the presence of a vinyl polymerization initiator in accordance with routine procedures. Methods of polymerization include solution polymerization, bulk polymerization, emulsion polymerization and suspension polymerization. Illustrative vinyl polymerization initiators are azo compounds such as azobisisobutyronitrile and triphenylmethylazobenzene, and peroxides such as benzoyl peroxide and di-tert-butyl peroxide.

In preparing polymer A and copolymer AB, care should be taken to minimize the amount of monomer or monomers that are left unreacted. To this end, the reaction time may be prolonged or the concentrations of monomers being polymerized may be increased or some other means for attaining a nearly 100% conversion to the desired polymer or copolymer is preferably adopted. However, the conversion to the desired polymer or copolymer may be reduced to 60% without compromising the objects of the present invention.

The polymer A and copolymer AB to be prepared by the methods described above preferably have weight average molecular weights within the range of 1,000 to 1,500,000. If the molecular weight of the polymer A or copolymer AB is too low, it is difficult to form a dry uniform and durable film. If the molecular weight of polymer A or copolymer AB is too high, it makes the varnish highly viscous. Such a high viscosity varnish should be thinned with a solvent for formulating a paint. Therefore, the resin solids content of the paint is reduced and only a thin dry film can be formed by a single application. This is inconvenient in that several applications of paint are necessary to attain a predetermined dry film thickness.

An antifoulant is also an essential component of the antifouling paint of the present invention. While a broad spectrum of known antifoulants may be employed, they are roughly divided into metal-containing organic compounds, metal-free organic compounds, and inorganic compounds.

Metal-containing organic compounds include organotin compounds, organocopper compounds, organonickel compounds, and organozinc compounds, as well as maneb, manzeb and propineb. Metal-free organic compounds include 1,4-naphthoquinones, N-trihalomethylthiophthalimides, dithiocarbamic acid compounds, N-arylmaleimides, 3-substituted -amino-1,3-thiazolidine-2,4-diones, thiocyanoalkylbenzoheterozoles, 3-isothiazolones, dialkyl polysulfides, isophthalonitriles, and dithiocyano based compounds. Inorganic compounds include copper compounds such as cuprous oxide, copper powder, copper thiocyanate, copper carbonate, copper chloride and copper sulfate, and other compounds such as zinc sulfate, zinc oxide and nickel sulfate.

Illustrative organotin compounds in the group of metal-containing organic compounds include: triphenyltin halides such as triphenyltin chloride and triphenyltin fluoride; tricyclohexyltin halides such as tricyclohexyltin chloride and tricyclohexyltin fluoride; tributyltin halides such as tributyltin chloride and tributyltin fluoride; and others such as triphenyltin hydroxide, tricyclohexyltin hydroxide, bis(triphenyltin)-$\alpha,\alpha'$-dibromosuccinate, bis(tricyclohexyltin)-$\alpha,\alpha'$-dibromosuccinate, bis(tributyltin)-$\alpha,\alpha'$-dibromosuccinate, bis-(triphenyltin)oxide, bis-(tricyclohexyltin)oxide, bis-(tributyltin)oxide, triphenyltin acetate, tricyclohexyltin acetate, tributyltin acetate, triphenyltin monochloroacetate, triphenyltin versatic acid esters, triphenyltin dimethyldithiocarbamate, and triphenyltin nicotinic acid esters.

Illustrative organocopper compounds include oxine copper, copper nonylphenolsulfonate, copper bis(3 chloro-1,4-naphthoquinon-2-oleate), copper bis(1,4-naphthoquinon-2-oleate), copper bis(ethylenediamine)-bis(dodecylbenzene sulfonate), copper acetate, copper naphthenate, and copper bis(pentachlorophenolate). Illustrative organo-nickel compounds include nickel acetate and nickel dimethyldithiocarbamate. Illustrative organozinc compounds include zinc acetate, zinc carbamate, and zinc dimethyldithiocarbamate.

Among the metal-free organic compounds listed above, N-trihalomethylthiophthalimides include N-trichloromethylthiophthalimide and N-fluorodichloromethylthiophthalimide; dithiocarbamic acid compounds include bis(dimethylthiocarbamoyl)disulfide, ammonium N-methyl-dithiocarbamate, ammonium ethylenebis(dithiocarbamate) and milneb; N-arylmaleimides include N-(2,4,6-trichlorophenyl)maleimide, N-4-tolylmaleimide, N-3-chlorophenylmaleimide, N-(4 n-butylphenyl)maleimide, N-(anilinophenyl)maleimide and N-(2,3 xylyl)maleimide; 3-substituted-amino-1,3-thiazolidine-2,4-diones include 3-benzylideneamino-1,3-thiazolidine-2,4-dione, 3-(4 methyl-benzylideneamino)-1,3-thiazolidine-2,4-dione, 3-(2hydroxybenzylideneamino)1,3-thiazolydine-2,4-dione, 3-(4-dimethylaminobenzylideneamino)-1,3-thiazolidine-2,4-dione, 3-(2,4 dichlorobenzylideneamino)-1,3-thiazolidine-2,4dione; thiocyanobenzoheterozole compounds include 2 thiocyanomethylthiobenzothiazole, 2-thiocyanomethylthio4,5,6,7-tetrachlorobenzothiazole, 2-thiocyanopropylthio5,7-dichlorobenzothiazole, 2-thiocyanoethylthio-4,6,7-trichlorobenzoxazole; 3-isothiazolone compounds include 2 n-hexyl-3-isothiazolone, 2-t butyl-3-isothiazolone, 5-chloro-2-n-octyl 3 isothiazolone, 2-(3,4-dichlorobenzyl)3-isothiazolone, 2-(p-chlorophenylethyl)-3-isothiazolone, 3-isothiazolone, 2-n-decyl-3-isothiazolone, 2-benzyl-3isothiazolone, 5-chloro-2-methyl-3-isothiazolone, 2-n-octyl-3-isothiazolone, 4,5-dichloro-2-n-octyl-3-isothiazolone; dialkyl polysulfide compounds include dimethyl tetrasulfide, diethyl pentasulfide, di-t-butyl pentasulfide, diethyl hexasulfide, dipropyl tetrasulfide, di-t-nonyl pentasulfide, di-t-dodecyl pentasulfide; isophthalonitrile compounds include 2,4,5,6-tetrachloro-1,3-iso-phthalonitrile; and dithiocyano compounds include dithiocyanomethane, dithiocyanoethane, and 2,5-dithiocyanothiophene.

Other examples of metal-free organic compounds include 2 amino-3-chloro-1,4-naphthoquinone, 2,3-dichloro1,4-naphthoquinone, and 5,10-dihydro-5,10-dioxanaphtho-[2,3-b]-1,4-dithiyne-2,3-dicarbonitrile.

In the present invention, one or more of the antifoulants listed above are selectively employed. The amount in which these antifoulants are used should be properly determined in consideration of the synergism of the antifouling effect anticipated from the slipping property of the film formed of polymer A and/or copolymer AB and the chemical antifouling effect imparted by a specific antifoulant. Generally, the antifoulants are desirably employed in amounts of 0.1-65 wt% of the total of polymer A and/or copolymer AB and the antifoulant. If the proportion of the antifoulant is too small, the synergism of the two kinds of antiofuling effects mentioned above is not attainable. If the proportion of the antifoulant is excessive, the antifouling film formed from the applied paint is likely to develop defects such as cracking and delamination and fails to produce effective fouling resistance.

In accordance with the present invention, a slipping agent may be used in addition to the combination of polymer A and/or copolymer AB and an antifoulant. Various materials that are known to impart a slipping property to paint film surfaces may be employed as slipping agents in the present invention. Typical examples of such materials include: (1) petroleum waxes of the class specified in JIS K 2235, which include paraffin wax having a melting point of from about 48.9° C. to 71° C., microcrystalline wax having a melting point of about 60° C. or over and petrolatum having a melting point of from about 45° C. to 80° C.; (2) liquid paraffins of the class specified in JIS K 2231, which have a kinetic viscosity of from about 90 to 110 centistokes at 40° C.; (3) silicone oils having kinetic viscosities of not more than 55,000 centistokes (cSt) at 25° C.; (4) fatty acids and esters thereof having melting points of −5° C. or higher and not less than 8 carbon atoms; (5) organic amines having an alkyl or alkenyl group containing 12-20 carbon atoms; and (6) polybutenes having kinetic viscosities of not more than 60,000 cSt at 25° C..

Specific examples of petroleum waxes (1) include paraffin wax, microcrystalline wax, and petrolatum. Specific examples of liquid paraffins (2) include equivalents of ISO VG 10, ISO VG 15, ISO VG 32, ISO VG 68 and ISO VG 100. Specific examples of silicone oils (3) include: KF 96-30, KF 96 H-50,000, KF 96 L-0.65, KF 96 L-2.0, KF 965, KF 50, KF 54 and KF 69 (all being trade names of Shin Etsu Chemical Co., Ltd.); TSF 440, TSF 410, TSF 4440, TSF 431, TSF 433, TSF 404, TFA 4200, YF 3860, YF 3818, YF 3841, YF 3953, and TSF 451 (all being trade names of Toshiba Silicone Co., Ltd.); and SH 200, SH 510, SH 3531, SH 230 and FS 1265 (all being trade names of Toray Silicone Co., Ltd.). Dimethyl silicone oil is most common but other silicone oils may also be used, such as methylphenyl silicone oil, polyether silicone oil, cyclic polysloixane oil, alkyl-modified silicone oils, methyl chlorinated phenyl silicone oil, higher fatty acid-modified silicone oils, and fluorosilicone oil.

Specific examples of fatty acids (4) include: caprylic acid, capric acid, lauric acid, myristic acid, palmitic acid, stearic acid, cerotic acid, montanic acid, melissic acid, lauroleic acid, oleic acid, vaccenic acid, gadoleic acid, cetolic acid, selacholeic acid, and juniperic acid; illustrative esters of these carboxylic acids include stearyl stearate, butyl laurate, octyl palmitate, butyl stearate, isopropyl stearate, cetyl palmitate, ceryl cerotate, myricyl palmitate, melissyl melissate, spermaceti, bees wax, carnauba wax, montan wax, Chinese insect wax, tristearin, tripalmitin, triolein, myristodilaurin, caprylolauromyristin, stearopalmitoolein, monostearin, monopalmitin, distearin, dipalmitin, tallow, lard, horse fat, mutton fat, cod-liver oil, coconut oil, palm oil, Japan tallow, Kapok oil, cacao butter, Chinese vegetable tallow, and illipe butter.

Specific examples of organic amines (5) include dodecylamine, tetradecylamine, hexadecylamine, octadecylamine, oleylamine, tallow alkylamines, coco-alkylamines amines, soybean alkylamines, didodecylamine, di-tallowhydrogenated alkylamines, dodecyldimethylamine, coco-alkyldimethylamine, tetradecyldimethylamine, hexadecyldimethylamine and octadecyldimethylamine.

Specific examples of polybutenes (6) include Nissan Polybutene ON, 06N, 015N, 3N, 5N, 10N, 30N, 200N, OSH, 06SH, 015SH, 3SH, 5SH, 10SH, 30SH and 200SH, all being trade names of Nippon Oil & Fats, Co., Ltd.

In the present invention, one or more of the slipping agents listed above are selectively used in amounts that should be properly determined in consideration of the drying properties, adhesion to substrate and antifouling effects offered by the combination of polymer A and/or copolymer AB with the antifoulant described above. Generally, the slipping agents are used in amounts of 1-70 wt%, preferably 5-50 wt%, of the total of polymer A and/or copolymer AB, antifoulant and slipping agent.

As will be apparent form the foregoing description, the antifouling paint of the present invention contains polymer A and/or copolymer AB and the antifoulant specified above as its essential components; alternatively, it may further contain the slipping agent described above. In either case, the antifouling paint of the present invention is typically used after being diluted with an organic solvent. Therefore, practical considerations indicate that it is preferred to prepare polymer A and/or copolymer AB by solution polymerization or bulk polymerization. In solution polymerization, the reaction solution obtained may be used either immediately or after being diluted with a solvent. In bulk polymerization, the reaction product obtained may be used after being dissolved in a solvent.

Examples of the organic solvent that can be used to dilute the antifouling paint of the present invention include: aromatic hydrocarbons such as xylene and toluene; aliphatic hydrocarbons such as hexane and heptane; esters such as ehtyl acetate and butyl acetate; alcohols such as isopropyl alcohol and butyl alcohol; ethers such as dioxane and diethyl ether; and ketones such as methyl ethyl ketone and methyl isobutyl ketone. These organic solvents may be used either alone or in admixture.

The organic solvents are preferably used in such amounts that the concentration of polymer A and/or copolymer AB in the solution generally range from 5 to 80 wt%, preferably from 30 to 70 wt%. The solution preferably has a viscosity of not higher than 150 poises at 25° C. in order to facilitate the film formation from the solution.

The antifouling paint of the present invention thus prepared may optionally contain colorants such as pigments (e.g., red oxide and titanium dioxide) and dyes. The paint may also contain conventional antisagging agents, antiflooding agents, antisettling agents, and antifoaming agents.

The surfaces of structures to be submerged in seawater are treated with the antifouling paint of the present invention to form an antifouling film. The procedure of such treatment is simple; for instance, a solution of the paint is applied to the surface of the structure of interest by an appropriate means and the solvent is removed by evaporation at ordinary temperature or under heating. This suffices for the purpose of forming a uniform antifouling film that exhibits good slip properties and the synergism with the antifoulant.

The polymer A and/or copolymer AB used in the present invention has the polydimethylsiloxane group and/or trimethylsilyl group that derives from monomer A and because of these groups, the polymer A or copolymer AB is capable of forming a paint film that has a very slipping surface. Therefore, the film itself formed from such polymer or copolymer has the ability to physically prevent the attachment of marine fouling organisms.

Vinyl polymerizable monomer B in copolymer AB serves as a modifying component that is effective in imparting an adequate level of slip properties to the surface of the film formed from copolymer AB, and in forming a polymer having a higher molecular weight than a homopolymer of monomer A.

The antifoulant used in the present invention provides chemical prevention against the attachment of marine fouling organisms and offers improved and lasting fouling resistance by synergism with the strong slipping effect of the film formed from polymer A and/or copolymer AB. It should, however, be noted that the slipping property of a paint film is not necessarily improved by use of the antifoulant.

As discussed above, in the antifouling paint of the first aspect of the present invention which employs polymer A and/or copolymer AB in combination with an antifoulant, polymer A and/or copolymer AB properly controls the antifoulant so that it will not dissolve in seawater either excessively or insufficiently and this will help provide a paint film that displays long-lasting fouling resistance in a consistent way.

In the second aspect of the present invention, a slipping agent is used in combination with polymer A and/or copolymer AB and the antifoulant. The slipping agent is important in that the combination thereof with polymer A and/or copolymer AB and the antifoulant ensures even longer lasting antifouling effects in a marine environment where the growth of fouling organisms is active. The present inventors consider that this enhanced retention of antifouling effect is due to the lasting slip properties of the film of antifouling paint that is achieved by the surface lubricating action of the slipping agent and by the ability to retard the deterioration of the film formed from polymer A and/or copolymer AB.

The polymer specified in the present invention for use in an antifouling paint is inert and forms a thermoplastic film that dries upon solvent evaporation and which is insoluble in seawater. Therefore, the antifouling paint of the present invention has the following advantages over the conventional antifouling paints.

First, it is stable and can be formulated in a paint without experiencing any risk of deterioration by reaction with antifoulants. The container of the paint does not need to be filled with an inert gas because it has an unlimited pot life.

Secondly, the paint dries quickly after application and yet will not blister or separate from the substrate because it will not experience any inadequate curing in the inner portion of the paint film and the drying speed is not affected by moisture or temperature.

Thirdly, the film formed from the antifouling paint of the present invention can be topcoated with a similar or dissimilar paint without sacrificing the strength of intercoat bonding.

Fourthly, the film formed from the paint of the present invention will not be eroded by contact with seawater and therefore retains good antifouling effects over a prolonged period. The superior antifouling effects of the film are supported by the fact that its surface has an angle of slip that is much smaller than that exhibited by the film formed from the conventional antifouling paint employing a crosslinked silicone rubber.

Because of these advantages, the paint film provided by the present invention exhibits excellent fouling resistance when applied to items that require protection against the attachment of marine fouling organisms, such as ship bottoms, structures in seawater such as fishing nets and cooling water pipes, or membranes used to prevent the spreading of sludge or slime occurring in under-sea civil engineering work. In this way, the antifouling paint of the present invention prevents substrates in seawater from being damaged by the attachment of fouling organisms.

EXAMPLE

The present invention is hereinafter described in greater detail with reference to the following examples of polymer preparation, working examples and comparative examples, wherein all parts are by weight basis. The data for viscosity were obtained by the measurement of bubble viscosities at 25° C., and the data for molecular weights are indicated in terms of weight average molecular weights as measured by GPC (gel permeation chromatography).

PREPARATION EXAMPLES 1, 2, 4, 5 AND 7

Into a flask equipped with a stirrer was charged a cooking solvent a (for its name and amount, see Table 1), which was heated to a predetermined reaction temperature. A liquid mixture of monomer A, monomer B and a polymerization catalyst (for their names and amounts, see Table 1) was introduced dropwise into the flask with stirring over a period of 2 to 3 hours. After completion of the addition, the contents of the flask were held at the predetermined reaction temperature for a period of 30 minutes. Subsequently, a mixture of a cooking solvent b and a polymerization catalyst b (for their names and amounts, see Table 1) was added dropwise over a period of 20 minutes, and the resulting mixture was held at the predetermined temperature for 3 to 5 hours with stirring so as to complete the polymerization reaction. Finally, a solvent was added to dilute the reaction product. By these procedures, polymer solutions I, II, IV, V and VII were prepared.

PREPARATION EXAMPLE 3

Into a heat- and pressure-resistant vessel was charged a monomer A, monomer B and a polymerization catalyst in accordance with the formulation shown in Table 1. The vessel was completely closed and the contents were heated to a predetermined reaction temperature under shaking. Thereafter, the shaking of the vessel was continued for 2 hours until polymerization reaction was completed. A diluting solvent was then added and shaking was continued for an additional 3 hours to obtain a polymer solution III.

PREPARATION EXAMPLE 6

Into a flask equipped with a stirrer was charged a cooking solvent a, a monomer A and a polymerization catalyst in accordance with the formulation shown in Table 1, and the contents of the flask were heated to a predetermined reaction temperature with stirring. The stirring of the reaction mixture was continued at the predetermined temperature for 3 hours to obtain a polymer solution VI.

PREPARATION EXAMPLES 8 TO 12

Into a flask equipped with a stirrer was charged a cooking solvent a (for its name and amount, see Table 2-1 and 2-2), which was heated to a predetermined reaction temperature. A liquid mixture of monomer A, monomer B and a polymerization catalyst a (for their names and amounts, see Tables 2 1 and 2-2) was introduced dropwise into the flask with stirring over a period of 6 hours. After completion of the addition, the contents of the flask were held at the predetermined reaction temperature for a period of 30 minutes. Subsequently, a mixture of a cooking solvent b and a polymerization catalyst b (for their names and amounts, see Tables 2-1 and 2-2) was added dropwise over a period of 20 minutes, and the resulting mixture was held at the predetermined temperature for 5 hours with stirring so as to complete the polymerization reaction. Finally, a solvent was added to dilute the reaction product. By these procedures, polymer solutions VIII–XII were prepared.

PREPARATION EXAMPLES 13 TO 15

Into a heat- and pressure-resistant vessel was charged a monomer A, monomer B and a polymerization catalyst in accordance with the formulations shown in Tables 2-1 and 2-2. The vessel was completely closed and the contents were heated to a predetermined temperature for reaction under shaking. Thereafter, the shaking of the vessel was continued for 8 hours until polymerization reaction was completed. A diluting solvent was then added and shaking was continued for an additional 3 hours to obtain polymer solutions XIII-–XV.

PREPARATION EXAMPLE 16

Into a flask equipped with a stirrer was charged a cooking solvent a, monomer A and a polymerization catalyst a in accordance with the formulation shown in Tables 2-1 and 2-2, and the contents of the flask were heated to a predetermined reaction temperature with stirring. The stirring of the reaction mixture was continued at the predetermined temperature for 6 hours to obtain polymer solution XVI.

TABLE 1

| Composition (parts) | Preparation Example |  |  |  |  |  |  |
|---|---|---|---|---|---|---|---|
|  | 1 | 2 | 3 | 4 | 5 | 6 | 7 |
| Cooking Solvent a |  |  |  |  |  |  |  |
| Butyl acetate | 120 | 180 | — | — | — | — | 30 |
| Xylene | — | — | — | 50 | 15 | 100 | — |
| Ethylene glycol monoethyl ether | — | — | — | — | 45 | — | — |
| Monomer A* |  |  |  |  |  |  |  |
| $A_1$ | 120 | — | — | — | — | — | — |
| $A_2$ | — | 180 | — | — | — | — | — |
| $A_3$ | — | — | 55 | — | — | — | — |
| $A_4$ | — | — | — | 15 | — | — | — |
| $A_5$ | — | — | — | — | 25 | — | — |
| $A_6$ | — | — | — | — | — | 100 | — |
| $A_7$ | — | — | — | — | — | — | 36 |
| Monomer B |  |  |  |  |  |  |  |
| Methyl methacrylate | 120 | 169.2 | 45 | 85 | 58 | — | 72 |
| Ethyl acrylate | — | 10.8 | — | — | — | — | — |
| Methacrylic acid | — | — | — | — | 2 | — | — |
| Butyl acrylate | — | — | — | — | 5 | — | — |
| Styrene | — | — | — | — | 10 | — | — |
| Butyl methacyrlate | — | — | — | — | — | — | 12 |
| Polymerization Catalyst a |  |  |  |  |  |  |  |
| Azobisisobutyronitrile | 1.2 | 3.6 | 5 | — | 0.6 | — | — |
| Benzoyl peroxide | — | — | — | 3 | — | 15 | 0.6 |
| Cooking Solvent b |  |  |  |  |  |  |  |
| Butyl acetate | 40 | 60 | — | — | — | — | 20 |
| Xylene | — | — | — | 20 | — | — | — |
| Ethylene glycol monoethyl ether | — | — | — | — | 20 | — | — |
| Polymerization Catalyst b |  |  |  |  |  |  |  |
| Azobisisobutyronitrile | 0.6 | 1.8 | — | — | 0.6 | — | — |
| Benzoyl peroxide | — | — | — | 1.5 | — | — | 0.2 |
| Diluting Solvent |  |  |  |  |  |  |  |
| Toluene | 80 | — | — | — | — | — | 130 |
| Xylene | — | 120 | — | — | — | — | — |
| Butyl acetate | — | — | 100 | — | — | — | — |
| Methyl isobutyl ketone | — | — | — | 30 | — | — | — |
| Butanol | — | — | — | — | 10 | — | — |
| Methyl ethyl ketone | — | — | — | — | 35 | — | — |
| Reaction Temp- | 100 | 115 | 130 | 110 | 120 | 140 | 80 |

TABLE 1-continued

| Composition | Preparation Example | | | | | | |
|---|---|---|---|---|---|---|---|
| (parts) | 1 | 2 | 3 | 4 | 5 | 6 | 7 |
| erature (°C.) | | | | | | | |
| Appearance of Polymer Solution | clear | clear | clear | translucent | clear | clear | clear |
| Viscosity of Polymer Solution | U | H | A | P | K | $A_3$ | Z |
| Molecular Weight of Polymer ($\times 10^3$) | 89 | 54 | 9 | 43 | 27 | 1 | 150 |
| Polymer Solution | I | II | III | IV | V | VI | VII |

*See Table 3

TABLE 2

| Composition (parts) | Preparation Example | | | | | | | | |
|---|---|---|---|---|---|---|---|---|---|
| | 8 | 9 | 10 | 11 | 12 | 13 | 14 | 15 | 16 |
| Cooking Solvnet a | | | | | | | | | |
| Butyl acetate | | 40 | | | | | | | 100 |
| Xylene | 50 | | 20 | 40 | | | | | |
| Ethylene glycol monoethyl ether | | | | | 15 | | | | |
| Monomer A* | | | | | | | | | |
| $A_8$ | 60 | | | | | | | | |
| $A_9$ | | 30 | | | | | | | |
| $A_{10}$ | | | 15 | | | | | | |
| $A_{11}$ | | | | 20 | | | | | |
| $A_{12}$ | | | | | 50 | | | | |
| $A_{13}$ | | 10 | | | | 25 | | | |
| $A_{14}$ | | | | | | | 45 | | |
| $A_{15}$ | | | | | | | | 20 | |
| $A_{16}$ | | | | | | | | | 100 |
| Monomer B | | | | | | | | | |
| Methyl methacrylate | 25 | 20 | | 80 | | 40 | 30 | 60 | |
| n-Butyl methacrylate | | 20 | 70 | | | 10 | | 20 | |
| Methacrylic acid | | | | | | 5 | | | |
| n-butyl acrylate | 5 | 10 | | | 5 | 5 | 10 | | |
| Styrene | 10 | 10 | 15 | | 45 | 20 | 15 | | |
| Polymerization Catalyst a | | | | | | | | | |
| Azobisisobutyronitrile | 0.5 | | | 0.6 | | | | | |
| Benzoyl peroxide | | 0.4 | 0.7 | | 0.8 | 0.5 | 0.6 | 0.5 | 0.4 |
| Cooking Solvent b | | | | | | | | | |
| Butyl acetate | | 10 | | | | | | | |
| Xylene | 10 | | 10 | 15 | | | | | |
| Ethylene glycol monoethyl ether | | | | | 10 | | | | |
| Polymerization Catalyst b | | | | | | | | | |
| Azobisisobutyronitrile | 0.2 | | | 0.2 | | | | | |
| Benzoyl peroxide | | 0.2 | 0.2 | | 0.5 | | | | |
| Diluting Solvent | | | | | | | | | |
| Toluene | | | 40 | | | 100 | | | |
| Xylene | 40 | | 160 | 100 | 50 | 100 | 130 | 100 | |
| Butyl acetate | | 70 | | 30 | | | | | |
| Methyl isobutyl ketone | | 20 | | | 50 | 50 | | | |
| Butanol | | | | | | | | 50 | |
| Methyl ethyl ketone | | 20 | | | 100 | 50 | | | |
| Reaction Temperature (°C.) | 95 | 120 | 140 | 110 | 160 | 170 | 130 | 130 | 140 |
| Appearance of Polymer Solution | clear | clear | translucent | translucent | clear | translucent | clear | clear | clear |
| Viscosity of Polymer Solution | X | Y | $Z_1$ | Y | P | Y | R | U | V |
| Molecular Weight of Polymer ($\times 10^3$) | 65 | 100 | 780 | 180 | 82 | 450 | 87 | 58 | 63 |
| Polymer Solution | VIII | IX | X | XI | XII | XIII | XIV | XV | XVI |

*See Table 3

Monomers $A_1$ to $A_{16}$ employed in Preparation Examples 1–16 were all represented by general formula (1), and X, n and m in the structure of each monomer are identified in the following Table 3.

TABLE 3

| Monomer | X | n | m |
|---|---|---|---|
| $A_1$ | $CH_3$ | 3 | 10 |
| $A_2$ | $CH_3$ | 3 | 3 |
| $A_3$ | $CH_3$ | 3 | 10 |
| $A_4$ | H | 2 | 70 |
| $A_5$ | $CH_3$ | 4 | 30 |
| $A_6$ | $CH_3$ | 3 | 0 |
| $A_7$ | $CH_3$ | 3 | 20 |
| $A_8$ | $CH_3$ | 3 | 75 |
| $A_9$ | H | 3 | 500 |
| $A_{10}$ | $CH_3$ | 3 | 4,500 |
| $A_{11}$ | $CH_3$ | 4 | 1,000 |
| $A_{12}$ | H | 2 | 150 |
| $A_{13}$ | H | 3 | 3,000 |
| $A_{14}$ | $CH_3$ | 4 | 300 |
| $A_{15}$ | H | 4 | 100 |
| $A_{16}$ | $CH_3$ | 3 | 200 |

EXAMPLES 1 TO 56

Fifty six samples of antifouling paint were prepared by dispersing the polymer solutions I to VII with a homomixer (2,000 rpm) in accordance with the formulations shown in Tables 4 to 6 (the figures in the tables are percents by weight). Paraffin wax 120P and petrolatum No. 1 listed in Tables 4 to 6 are petroleum waxes of the types specified in JIS K 2235; ISO VG 10 is a liquid paraffin of the type specified in JIS K 2231; KF 69 is the trade name of Shin-Etsu Chemical Co., Ltd. for a silicone oil; Oil Blue® 2N is the trade name of Orient Chemical Industry Co., Ltd. for a dye; and Disparon® 6900-20X and Aerosil® 300 are the trade names of Kusumoto Kasei K.K. and Nippon Aerosil Co., Ltd., respectively, for antisagging agents.

COMPARATIVE EXAMPLES 1 TO 4

Four samples of antifouling paint having the formulations shown in Table 7 were prepared as in Examples 1 to 56 except that polymer solutions I to III were employed.

TABLE 4

| Paint Composition (parts) | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| Polymer solution | | | | | | | | | | | | | | | | | | | | | | |
| I | 90 | 60 | | | | | | | | | | | | | | | | | | | | |
| II | | | 80 | 80 | | | | | | | | | | | | | | | | | | |
| III | | | | | 60 | 85 | 50 | | | | | | | 30 | 50 | 60 | 50 | 80 | | | | 70 |
| IV | | | | | | | | 40 | 50 | 30 | 60 | 60 | | | | | | | 70 | 60 | 55 | |
| V | | | | | | | | | | | | | 70 | | | | | | | | | |
| VI | | | | | | | | | | | | | | | | | | | | | | |
| VII | | | | | | | | | | | | | | | | | | | | | | |
| Antifoulant | | | | | | | | | | | | | | | | | | | | | | |
| Triphenyltin hydroxide | 0.5 | 10 | | | | | | | | | | | | | | | | | | | | |
| Tricyclohexyltin chloride | | | 5 | | | | | | | | | | | | | | | 0.1 | | | 0.1 | |
| Tributyltin chloride | | | | 5 | | | | | | | | | | | | | 30 | | | | | |
| Bis(triphenyltin)-α,α'-dibromosuccinate | | | | | 10 | | | | | | | | | | | | | | | 0.3 | | |
| Bis(tributyltin)oxide | | | | | | .3 | | | | | | | | | | | | | 0.5 | | | |
| Triphenyltin dimethyl dithiocarbamate | | | | | | | 15 | | | | | | | | | | | | | | | |
| Oxine copper | | | | | | | | 40 | | | | | | | | | | | | | | |
| Copper nonylphenol-sulfonate | | | | | | | | | 20 | | | | | | | | | | | | | |
| Copper acetate | | | | | | | | | | 45 | | | | | | | | | | | 5 | |
| Nickel dimethyldithio-carbamate | | | | | | | | | | | 15 | | | | | | | | | | | |
| Zinc carbamate | | | | | | | | | | | | 20 | | | | | | | | | | |
| 2-Amino-3-chloro-1,4-naphthoquinone | | | | | | | | | | | | | 10 | 50 | | | | | | | | |
| 2,3-Dichloro-1,4-naphthoquinone | | | | | | | | | | | | | | | 30 | | | | | | | 3 |
| N—Trichloromethyl thiophthalmide | | | | | | | | | | | | | | | | 15 | | | 6 | 15 | 10 | |
| N—fluorodichlorometyl thiophthalmide | | | | | | | | | | | | | | | | | | 5 | | | | 3 |
| Pigment | | | | | | | | | | | | | | | | | | | | | | |
| TiO₂ | | 3 | | | | | | | | | | | | | | 5 | | | | | | |
| Dye | | | | | | | | | | | | | | | | | | | | | | |
| Oil Blue 2N | | | | | | | | | | | | | 2 | | | | 1 | | | | | |
| Antisagging Agent | | | | | | | | | | | | | | | | | | | | | | |
| Disparon ® 6900-20X | 5 | | 1 | 1 | 1 | 6 | 2 | 3 | 10 | 5 | 1 | 6 | 3 | 1 | 3 | 5 | 3 | 3 | 5 | 5 | 2 | 6 |
| Aerosil ® 300 | | | | | | | | | | | 14 | | | | | | | | | | | |
| Diluting Solvent | | | | | | | | | | | | | | | | | | | | | | |
| Toluene | | | 10 | 10 | 20 | | 20 | | 10 | | 10 | 10 | 15 | 10 | 10 | 12 | 10 | 11.9 | | | 10 | 10 |
| Xylene | 4.5 | 20 | | | | 6 | | 17 | | 10 | | 4 | | | 6 | 3 | 3 | | 15 | 15 | 10 | 7.9 |
| Ethyl acetate | | | 4 | 4 | 9 | | 13 | | 10 | | | | | | | | | | 15 | 4.7 | | |
| Methyl isobutyl ketone | | 5 | | | | | | | | | | | | 7 | 1 | | | | 3.5 | | 8 | |
| Isopropyl alcohol | | 2 | | | | | | | | | | | | 2 | | | | | | | | |
| Total | 100 | 100 | 100 | 100 | 100 | 100 | 100 | 100 | 100 | 100 | 100 | 100 | 100 | 100 | 100 | 100 | 100 | 100 | 100 | 100 | 100 | 100 |

TABLE 5

| Paint composition (parts) | Example | | | | | | | | | | | | | | | | | | | | | |
|---|---|---|---|---|---|---|---|---|---|---|---|---|---|---|---|---|---|---|---|---|---|---|
| | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
| Polymer solution | | | | | | | | | | | | | | | | | | | | | | |
| I | 80 | 70 | 60 | 50 | 45 | 60 | 55 | 70 | 70 | | | | | | | | | | | | | |
| II | | | | | | | | | | 50 | | | | | | | | | | | | |
| III | | | | | | | | | | | 25 | 60 | 50 | 60 | 70 | 65 | 80 | 50 | 50 | 50 | | |
| IV | | | | | | | | | | | | | | | | | | | | | 50 | 50 |
| Antifoulant | | | | | | | | | | | | | | | | | | | | | | |
| Triphenyltin hydroxide | | | | | | | | | | | | | | 0.1 | 0.1 | 0.2 | 0.1 | | 0.3 | 0.2 | | |
| Bis(tributyltin)oxide | | | | | | | | | | | | | | | 3 | 2 | 1 | 5 | | | | |
| 2-Amino-3-chloro-1,4-naphthoquinone | | | | | | | | | | | | | | | | | 1 | | | | 5 | |
| N—Trichloromethyl thiophthalimide | | | | | | | | | | | | | | | | | | | | | | 2 |
| Bis(dimethylthiocarbamoyl)disulfide | 5 | | | | | | | | | | | | | | | | | | | | | |
| Ammonium ethylene bis(dithiocarbamate) | | 10 | | | | | | | | | | | | | | | | | | | | |
| N—(2,4,6-trichlorophenyl)maleimide | | | 3 | | | | | | | | | | | | | | | | | | | |
| N—3-Chlorophenylmaleimide | | | | 10 | | | | | | | | | | | | | | | | | | |
| N—4-Tolyl maleimide | | | | | 20 | | | | | | | | | | | 5 | | | | | | |
| 3-Benzylideneamino-1,3-thiazoline-2,4-dione | | | | | | 10 | | | | | | | | | | | | | | | | |
| 3-(2,4-dichlorobenzyl-ideneamino)-1,3-thiazoline-2,4-dione | | | | | | | 8 | | | | | | | | | | | | | | | |
| Dithiocyanoethane | | | | | | | | 3 | | | | | | | 2 | | | | | | | |
| 2,5-Dithiocyanothiophene | | | | | | | | | 5 | | | | | | | | | | | | | |
| Cuprous oxide | | | | | | | | | | 20 | 60 | 10 | | 10 | | | 5 | 15 | | 10 | | 10 |
| Copper thiocyanate | | | | | | | | | | | 5 | 3 | | | | | | | | | | |
| Zinc sulfate | | | | | | | | | | | | 2 | | | | | | | | | | |
| Slipping agent | | | | | | | | | | | | | | | | | | | | | | |
| Paraffin wax 120P | | | | | | | | | | | | | 15 | | | | | | 5 | 3 | 2 | |
| Petrolatum No. 1 | | | | | | | | | | | | | | | | | | | | | 2 | 10 |
| Pigment | | | | | | | | | | | | | | | | | | | | | | |
| TiO₂ | | | | | | | | | | 10 | | | | | | | | | | 3 | | |
| Dye | | | | | | | | | | | | | | | | | | | | | | |
| Oil Blue ® 2N | 3 | | | | | | | | | | 10 | 25 | | | | 3 | | | | 3 | | |
| Antisagging Agent | | | | | | | | | | | | | | | | | | | | | | |
| Disparon ® 6900-20X | 2 | 1 | 2 | 1 | 2 | 2 | 2 | 2 | 2 | 2 | | 2 | 2 | 2 | 2 | 2 | 2 | 2 | 2 | 2 | 2 | 2 |
| Aerosil ® 300 | | | | | | | | | 3 | | | | | | | | | 5 | 20 | 10 | | |
| Diluting Solvent | | | | | | | | | | | | | | | | | | | | | | |
| Toluene | 10 | 9 | 10 | 19 | 23 | 8 | | 20 | 20 | 18 | | 23 | 33 | 27.9 | 22.9 | 22.8 | 10.9 | 18 | 22.7 | 11.8 | 39 | 26 |
| Xylene | | 10 | 20 | 20 | 5 | 10 | 20 | 5 | | | | | | | | | | 5 | | 10 | | |
| Ethyl acetate | | | | | 5 | 5 | 15 | | | | | | | | | | | 5 | | | | |
| Methyl isobutyl ketone | | | 5 | | | 5 | | | | | | | | | | | | | | | | |
| Total | 100 | 100 | 100 | 100 | 100 | 100 | 100 | 100 | 100 | 100 | 100 | 100 | 100 | 100 | 100 | 100 | 100 | 100 | 100 | 100 | 100 | 100 |

TABLE 6

| Paint composition (parts) | Example 45 | 46 | 47 | 48 | 49 | 50 | 51 | 52 | 53 | 54 | 55 | 56 |
|---|---|---|---|---|---|---|---|---|---|---|---|---|
| Polymer solution | | | | | | | | | | | | |
| I | 60 | 50 | 40 | 70 | | | | | | | | |
| II | | | | | 55 | 60 | 60 | 55 | | | | |
| III | | | | | | | | | 55 | 65 | 65 | |
| IV | | | | | | | | | | | | 70 |
| Antifoulant | | | | | | | | | | | | |
| Triphenyltin hydroxide | 1 | | | | | | | | | 0.3 | | |
| 2-Amino-3-chloro-1,4-naphthoquinone | | 5 | | 3 | 10 | | 1 | 10 | | | 2 | 1 |
| N—Fluorodichloromethylthiophthalimide | | | | 2 | | 10 | | | | | | 3 |
| Cuprous oxide | | | 15 | | | | 8 | | 15 | | | |
| Slipping agent | | | | | | | | | | | | |
| Palm oil | 5 | | | | | | | | | 5 | | 3 |
| ISO VG 10 | | 10 | | | | | | | | 4 | 5 | |
| KF 69 | | | 10 | | | | | | | | | |
| Spermaceti | | | | 7 | | | | | | | | |
| Stearyl stearate | | | | | 6 | | | | | | | |
| Tripalmitin | | | | | | 3 | | | | | | |
| Dodecylamine | | | | | | | 5 | | | | 5 | |
| Tetradecylamine | | | | | | | | 5 | | | | 2 |
| Soybean alkylamine | | | | | | | | | 5 | | | |
| Pigment | | | | | | | | | | | | |
| TiO$_2$ | 3 | | | | 2 | 3 | | | | | | |
| Antisagging Agent | | | | | | | | | | | | |
| Disparon ® 6900-20X | 5 | 5 | 5 | 5 | | 6 | 6 | 6 | | | 3 | 4 |
| Aerosil ® 300 | | | | | 2 | | | | 1 | 1 | | |
| Diluting Solvent | | | | | | | | | | | | |
| Toluene | 16 | | | | 20 | 10 | 10 | 14 | 14 | 14.7 | 10 | |
| Xylene | 10 | 20 | 20 | 13 | | | | 5 | | 5 | 10 | 17 |
| Ethyl acetate | | 10 | | | | 4 | | 5 | 5 | 5 | | |
| Methyl isobutyl ketone | | | 10 | | | 4 | 10 | | 5 | | | |
| Isopropyl alcohol | | | | | 5 | | | | | | | |
| Total | 100 | 100 | 100 | 100 | 100 | 100 | 100 | 100 | 100 | 100 | 100 | 100 |

TABLE 7

| Paint composition (parts) | Comparative Example 1 | 2 | 3 | 4 |
|---|---|---|---|---|
| Polymer solution | | | | |
| I | 60 | | | 50 |
| II | | 55 | | |
| III | | | 65 | |
| Slipping agent | | | | |
| Paraffin wax 120 | | 2 | | |
| Petrolatum No. 1 | 8 | | 3 | |
| ISO VG 10 | | 5 | | |
| KF 69 | | | | 10 |
| Dodecylamine | | 7 | | |
| Tetradecylamine | | | 3 | |
| Antisagging Agnet | | | | |
| Aerosil ® 300 | 2 | 2 | 2 | 2 |
| Diluting Solvent | | | | |
| Toluene | | 29 | | |
| Xylene | 30 | | 17 | 48 |
| Total | 100 | 100 | 100 | 100 |

EXAMPLES 57 TO 81

Twenty-five samples of antifouling paint were prepared by dispersing the polymer solutions I, V and VIII to XVI with a homomixer (2,000 rpm) in accordance with the formulations shown in Table 8 (the figures in the table are percents by weight). Petrolatum No. 1, ISO VG 10, Oil Blue ® 2N, Disparon ® 6900-20X, and Aerosil ® 300 were the same as identified in Examples 1–56. TSF 433 listed in Table 8 is the trade name of Toshiba Silicone Co., Ltd. for a silicone oil, and Nissan Polybutene 06N is the trade name of Nippon Oil & Fats Co., Ltd. for a polybutene.

COMPARATIVE EXAMPLE 5

A sample of antifouling paint was prepared as in Examples 57–81 in accordance with the formulation shown in Table 8 except that polymer solutions I, V and VIII to XVI were replaced by KE 45 TS (the trade name of Shin-Etsu Chemical Co., Ltd. for a 50 wt% toluene solution of a low-temperature curing oligomer-like silicone rubber).

COMPARATIVE EXAMPLE 6

A sample of antifouling paint was prepared as in Examples 57–81 in accordance with the formulation shown in Table 8 except that polymer solutions I, V and VIII to XVI were replaced by an organotin copolymer solution.

The organotin copolymer solution used in this comparative example had been prepared by copolymerizing 40 parts of methyl methacyrlate, 20 parts of octyl acrylate and 40 parts of tributyltin methacrylate; the copolymer had a weight average molecular weight of 90,000 and was dissolved in xylene to form a clear 50 wt% solution.

TABLE 8

| Paint Composition (parts) | Example 57 | 58 | 59 | 60 | 61 | 62 | 63 | 64 | 65 | 66 | 67 | 68 | 69 | 70 | 71 | 72 | 73 | 74 |
|---|---|---|---|---|---|---|---|---|---|---|---|---|---|---|---|---|---|---|
| Polymer solution | | | | | | | | | | | | | | | | | | |
| I | | | | | | | | | | | | | | | | | | |
| V | | | | | | | | | | | | | | | | | | |
| VIII | 90 | | | | | | | | | | | | | | | 70 | | 20 |

TABLE 8-continued

| Component | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| IX | 60 | | | | | | | | 60 | | | | | | | | |
| X | | 80 | | | | | | | | | | | | | | | |
| XI | | | 80 | | | | 30 | | | | 50 | | | | | 50 | |
| XII | | | 60 | | | | | | | | | | | | | | |
| XIII | | | | 85 | | | | | | | | | 60 | | | | |
| XIV | | | | 50 | | | | 40 | | | | | | | | | |
| XV | | | | | 40 | | | | | | | | | | | 40 | |
| XVI | | | | | 50 | | | | | | | | | | | | 30 |
| KE 45 TS | | | | | | | | | | | | | | | | | |
| Orgnotin copolymer solution | | | | | | | | | | | | | | | | | |
| Antifoulant | | | | | | | | | | | | | | | | | |
| Cuprous oxide | | | | | 30 | 15 | | | 20 | | | | | | | 10 | 5 |
| Copper | | 10 | | | | 15 | 10 | | | 5 | thio-cyanate | | | | | | |
| N—Trichloromethylthiophthalimide | | | 5 | | | | | | | | | | | | 3 | | |
| Ammonium ethylenebis(dithiocarbamate) | | | | | 10 | | | | | | 10 | | | | | | |
| Triphenyltin hydroxide | 0.5 | | | 10 | 3 | | | 1 | 0.5 | | | 1 | | | | | 0.3 |
| Di-t-nonyl pentasulfide | | | | | | | | | | | | | | | | | |
| 2,4,5,6-Tetrachloro-1,3-isophthalonitrile | | | | | | | | | | | | | | | | | |
| 2-Thiocyanomethylthiobenzothiazole | | | | | | | | | | | | | | | | | |
| 2-Thiocyanoethylthio-4,6,7-trichlorobenzoxazole | | | | | | | | | | | | | | | | | |
| 4,5-Dichloro-3-isothiazolone | | | | | | | | | | | | | | | | | |
| Slipping agent | | | | | | | | | | | | | | | | | |
| Petrolatum No. 1 | | | | | | | | | 5 | | | | | 5 | | | |
| ISO VG 10 | | | | | | | | | | 10 | | | | 5 | | | 10 |
| TSF 433 | | | | | | | | | | | 10 | | | | 5 | | |
| Dodecylamine | | | | | | | | | | | | 5 | | | | | |
| Nissan Polybutene O6N | | | | | | | | | | | | | 10 | | | 10 | |
| Pigment | | | | | | | | | | | | | | | | | |
| TiO$_2$ | | | | | 3 | | | | | | | | | | | | |
| Dye | | | | | | | | | | | | | | | | | |
| Oil Blue 2N | | 1 | | | | | 1 | | 0.5 | | | | | | | | |
| Antisagging agent | | | | | | | | | | | | | | | | | |
| Disparon ® 6900 20X | 3 | 2 | | 3 | | 2 | 5 | | 5 | 4 | | | 5 | | 3 | 5 | 2 |
| Aerosil ® 300 | | | 2 | | 2 | | | 4 | | | 2 | 2 | | 2 | | | |
| Dilusting solvent | | | | | | | | | | | | | | | | | |
| Toluene | | | | | | | | | | | | | | | | | |
| Xylene | 6.5 | 27 | 13 | 14 | 10 | 8 | 40 | 20 | 34 | 30 | 18 | 33 | 20 | 17 | 34 | 20 | 32.7 |
| Methyl isobutyl ketone | | | 10 | 10 | | | | 10 | 20 | | | 10 | | | | 10 | |
| Isopropyl alcohol | | | | | | 10 | | | | | | | | | | | |
| Total | 100 | 100 | 100 | 100 | 100 | 100 | 100 | 100 | 100 | 100 | 100 | 100 | 100 | 100 | 100 | 100 | 100 |

| Paint composition (parts) | Example 75 | 76 | 77 | 78 | 79 | 80 | 81 | Comparative Example 5 | 6 |
|---|---|---|---|---|---|---|---|---|---|
| Polymer solution | | | | | | | | | |
| I | | | | 70 | | 30 | 50 | 5 | |
| V | | | | | 50 | 20 | 10 | | |
| VIII | 20 | 20 | | | | | | | |
| IX | | | 10 | | | | | | |
| X | 30 | 20 | | 10 | 5 | | 50 | | |
| XI | | 10 | | | | | | | |
| XII | | | | | | | | | |
| XIII | | | | | | | | | |
| XIV | | | | | | | | | 50 |
| XV | | | | | | | | | 40 |
| XVI | | | | | | | | | |
| KE 45 TS | | | | | | | | | |
| Orgnotin copolymer solution | | | | | | | | | |
| Antifoulant | | | | | | | | | |

TABLE 8-continued

|  | 1 | 2 | 3 | 4 | 5 | 6 | 7 | 8 | 9 |
|---|---|---|---|---|---|---|---|---|---|
| Cuprous oxide |  |  | 8 |  |  |  |  |  | 40 |
| Copper thiocyanate |  |  |  |  |  |  |  |  |  |
| N—Trichloromethyl-thiophthalimide | 2 |  |  |  |  |  |  |  |  |
| Ammonium ethylenebis (dithiocarbamate) | 2 |  |  |  |  |  |  |  |  |
| Triphenyltin hydroxide |  |  |  |  |  |  |  |  |  |
| Di-t-nonyl pentasulfide |  |  |  | 3 |  |  |  |  |  |
| 2,4,5,6-Tetrachloro-1,3-isophthalonitrile |  |  | 10 | 5 |  |  |  |  |  |
| 2-Thiocyanomethylthio-benzothiazole |  |  | 6 |  | 10 | 2 |  |  |  |
| 2-Thiocyanoethylthio-4,6,7-trichloro-benzoxazole |  |  |  |  |  | 15 |  |  |  |
| 4,5-Dichloro-3-iso-thiazolone |  |  |  |  |  | 15 |  |  |  |
| Slipping agent |  |  |  |  |  |  |  |  |  |
| Petrolatum No. 1 |  | 15 |  |  | 5 | 3 |  |  |  |
| ISO VG 10 |  |  |  |  |  |  | 10 |  |  |
| TSF 433 | 5 |  |  | 10 |  | 3 |  |  |  |
| Dodecylamine | 5 |  |  |  |  |  |  |  |  |
| Nissan Polybutene O6N |  |  | 10 | 5 |  | 3 |  |  |  |
| Pigment |  |  |  |  |  |  |  |  |  |
| TiO$_2$ |  |  |  |  |  |  |  |  |  |
| Dye |  |  |  |  |  |  |  |  |  |
| Oil Blue 2N |  |  |  |  |  |  |  |  |  |
| Antisagging agent |  |  |  |  |  |  |  |  |  |
| Disparon ® 6900 20X |  | 3 | 3 | 3 | 3 | 3 |  |  | 6 |
| Aerosil ® 300 | 2 |  |  |  |  |  |  | 3 |  |
| Dilusting solvent |  |  |  |  |  |  |  |  |  |
| Toluene |  |  |  |  | 14 |  | 11 | 37 |  |
| Xylene | 34 | 14 | 11 | 10 |  | 15 | 10 |  | 14 |
| Methyl isobutyl ketone |  |  |  | 9 | 3 |  |  |  |  |
| Isopropyl alcohol |  |  |  |  |  |  |  |  |  |
| Total | 100 | 100 | 100 | 100 | 100 | 100 | 100 | 100 | 100 |

The performance of the samples of antifouling paint prepared in Examples 1 to 76 and Comparative Examples 1 to 6 was evaluated by a physical performance test, the measurement of slip angles for the surface of the paint film formed from the individual samples and by an antifouling performance test. Each of the tests and measurement thereof was conducted by the procedures shown below. The results are shown in Tables 9 to 11.

Physical Performance Test

The storage stability, drying property and adhesion to a substrate were evaluated for each sample by the following methods.

(A) Storage Stability 200 ml of each sample was put into a 250 ml-glass container which was closed with a cap. The container was stored in an air conditioned room (70° C x 75% RH) for two weeks. The stability of the sample was determined in terms of any increase in its viscosity and evaluated by the following criteria: o, the increase in viscosity was less than 10% of the initial value; Δ, the increase was from 10% to less than 100% of the initial value; and x, the increase was at least 100% of the initial value.

(B) Drying Property

In accordance with the method specified in JIS K 5400.5.8, each of the samples was coated onto a glass plate in a wet film thickness of 100 μm with a film applicator. The drying property of the film was evaluated by the following criteria: o, the tack-free drying time was less than 1 hour; Δ, the tack-free drying time was from 1 hour to less than 3 hours; and x, the tack-free drying time was at least 3 hours. Each of the test pieces had been desiccated in an air conditioned room (20° C.×75% RH).

(C) Adhesion to Substrate

Evaluation of adhesion to a substrate was conducted in accordance with the method of a cross cut adhesion test specified in JIS K 5400.6.15; each of the samples was coated onto a polished steel panel (150×70×1 mm) in a wet film thickness of 100 μm with a film applicator and dried for 1 week in an air conditioned room (20° C. x 75% RH); a 20 mm long crossed groove was cut through the film into the substrate with a cutter knife; the so prepared test piece was set in an Erichsen film tester and a steel ball was pressed against the center of the back side of the test piece to produce a vertical deformation of 10 mm. The adhesion of the film to the substrate was evaluated in terms of the length of peel from the substrate as measured from the center of the cross cut. The criteria used were as follows: 0, 0 mm; Δ, less than 5 mm; and x, 5 mm or more.

Measurement of Slip Angle

Figure 1B:
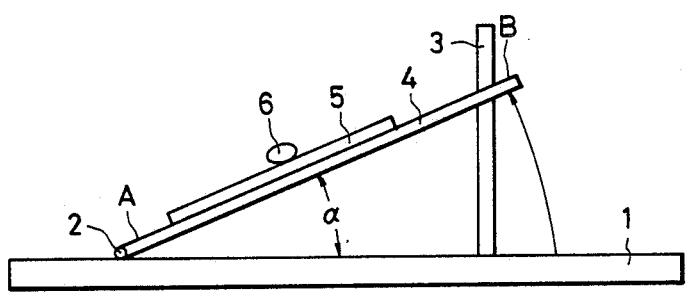

Test plates were prepared in the same manner as in the case of the drying test (B) and the angle of slip on the surface of the paint film formed on each test plate was measured with a slip angle meter. As shown in FIGS. 1(A) and 1(B), the slip angle meter was composed of a transparent glass plate 1, a fastening device 2, a support rod 3 and a movable plate 4. The movable plate 4 was disposed on the glass plate 1 in such a manner that it was fixed at one end A with the fastener 2 while the other end B was movable upwardly along the rod 3.

The procedures of slip angle measurement were as follows. First, as shown in FIG. 1(A), a test plate 5 was placed horizontally, with the paint film facing up, on the movable plate 4, and a given amount (0.2 ml) of sterilized, filtered seawater was dropped from a syringe to deposit a waterdrop 6 at a position whose distance ($\gamma$) from the fastener 2 (i.e., one end A of the movable plate 4) was 185 mm. Then, as shown in FIG. 1(B), the other end B of the movable plate 4 was moved upwardly along the rod 3 at a speed of 1 mm/sec.

The angle of inclination, a, of the movable plate 4 at which the waterdrop 6 began to slide down the inclined test plate 5 was measured and used as the slip angle of the surface of the paint film on the test plate.

All measurements were conducted in an air conditioned room (25° C. x 75% RH) and three measurements conducted with each test plate were averaged to calculate the slip angle for that plate.

Antifouling Performance Test

Sand blasted steel panels (100×200×1 mm) were coated with a coal tar-vinyl based anticorrosive paint. Both surfaces of each panel were sprayed with two layers of an antifouling paint under test so as to provide a dry film thickness of 120 $\mu$m on each side.

The so prepared test panels were immersed in seawater at Aioi Bay, Aioi, Hyogo, Japan (this bay is known to be a marine environment where the attachment and growth of fouling organisms is very active) for 24 months, during which period the increase in the area of the test panel that was covered by the marine fouling organisms (% attachment of fouling organisms) was measured at regular intervals of time.

TABLE 9

| | Example | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
| Storage stability | | | | | | | | | | | | | | | | | | | | | | | | | | | | | | | | | | | |
| Drying property | | | | | | | | | | | | | | | | | | | | | | | | | | | | | | | | | | | |
| Adhesion to substrate | | | | | | | | | | | | | | | | | | | | | | | | | | | | | | | | | | | |
| Surface slip angle (degrees) | 8.1 | 9.5 | 9.3 | 9.3 | 9.9 | 8.2 | 10.2 | 10.5 | 10.1 | 10.5 | 9.7 | 10.1 | 9.3 | 10.7 | 10.2 | 10.1 | 10.3 | 9.2 | 9.5 | 9.7 | 9.5 | 9.2 | 9.2 | 9.5 | 9.0 | 9.5 | 9.4 | 9.5 | 9.4 | 8.9 | 9.1 | 9.4 | 10.4 | 10.1 | 10.2 |
| Antifouling-test | | | | | | | | | | | | | | | | | | | | | | | | | | | | | | | | | | | |
| 3 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| % Attachment of fouling organisms | | | | | | | | | | | | | | | | | | | | | | | | | | | | | | | | | | | |
| 12 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 24 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

TABLE 10

| | Example 36 | 37 | 38 | 39 | 40 | 41 | 42 | 43 | 44 | 45 | 46 | 47 | 48 | 49 | 50 | 51 | 52 | 53 | 54 | 55 | 56 | Comparative Example 1 | 2 | 3 | 4 |
|---|---|---|---|---|---|---|---|---|---|---|---|---|---|---|---|---|---|---|---|---|---|---|---|---|---|
| Storage stability | | | | | | | | | | | | | | | | | | | | | | | | | |
| Drying property | | | | | | | | | | | | | | | | | | | | | | | | | |
| Adhesion to substrate | | | | | | | | | | | | | | | | | | | | | | | | | |
| Surface slip angle (degrees) | 9.4 | 9.5 | 9.4 | 9.1 | 9.6 | 8.7 | 9.4 | 9.5 | 9.7 | 8.6 | 9.2 | 9.0 | 9.3 | 9.6 | 9.8 | 9.7 | 9.5 | 9.0 | 8.7 | 9.1 | 9.7 | 8.3 | 8.8 | 9.0 | 7.9 |
| Antifouling test | | | | | | | | | | | | | | | | | | | | | | | | | |
| 3 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| % Attachment of fouling organisms | | | | | | | | | | | | | | | | | | | | | | | | | |
| 12 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 5 |
| 24 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 5 | 5 | 8 | 20 |

TABLE 11

| | Example 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 | Comparative Example 5 | 6 |
|---|---|---|---|---|---|---|---|---|---|---|---|---|---|---|---|---|---|---|---|---|---|---|---|---|---|---|---|
| Storage stability | | | | | | | | | | | | | | | | | | | | | | | | | | X | Δ |
| Drying property | | | | | | | | | | | | | | | | | | | | | | | | | | X | Δ |
| Adhesion to substrate | | | | | | | | | | | | | | | | | | | | | | | | | | X | |
| Surface slip angle (degrees) | 8.2 | 8.6 | 8.8 | 8.0 | 8.2 | 8.0 | 9.7 | 9.4 | 9.1 | 9.6 | 8.7 | 9.8 | 9.0 | 9.9 | 8.4 | 8.3 | 9.0 | 8.9 | 8.4 | 8.5 | 8.1 | 8.3 | 8.0 | 8.1 | 8.2 | 14.0 | 25.0 |
| Antifouling test | | | | | | | | | | | | | | | | | | | | | | | | | | | |
| 3 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 30 | 0 |
| 6 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 50 | 0 |
| % Attachment of fouling organisms | | | | | | | | | | | | | | | | | | | | | | | | | | | |
| 12 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 90 | 10 |
| 18 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 100 | 10 |
| 24 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 100 | 50 |

As the data in Table 9 to 11 show, the samples of antifouling paint prepared in Examples 1 to 76 were satisfactory in storage stability, drying property and adhesion to substrate. The paint films formed from these samples had surface slip angles within the range of 7 to 11 degrees. The paint films from the samples of Examples 1 to 40 and those from the samples of Examples 57–66 had surface slip angles of not larger than 11 and 9.7 degrees, respectively, although none of these samples used any slipping agent. These data show that the polymer specified by the present invention was sufficient to form a film that had a satisfactory degree of surface lubricity. No attachment of fouling organisms was observed for a period of at least 24 months of immersion in seawater.

The paint samples prepared in Comparative Examples 1–4 did not contain the antifoulant which was one of the essential components of the antifouling paint formulation of the present invention. Therefore, attachment of fouling organisms was observed after 18–24 months.

The sample prepared in Comparative Example 5 was a silicone rubber based paint and was unsatisfactory with respect to storage stability, drying property and adhesion to substrates. It was also low in antifouling effects as manifested by the high slip angles of the paint film.

The sample prepared in Comparative Example 6 was an antifouling paint based on an organotin copolymer. It was somewhat poor in storage stability and antifouling effects. The film formed from this paint was rather hydrophilic and had a high surface slip angle.

While the invention has been described in detail and with reference to specific embodiments thereof, it will be apparent to one skilled in the art that various changes and modifications can be made therein without departing from the spirit and scope thereof.

What is claimed is:

1. An antifouling paint comprising an antifoulant and a polymer formed from a monomer represented by formula (I):

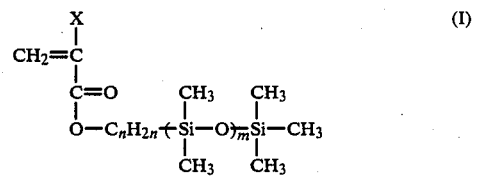

wherein X is a hydrogen atom or a methyl group; n is an integer of 2 to 4; and m signifies the average degree of polymerization and is zero or a positive integer.

2. An antifouling paint comprising an antifoulant and a copolymer comprising a monomer represented by formula (I) and a copolymerizable vinyl monomer

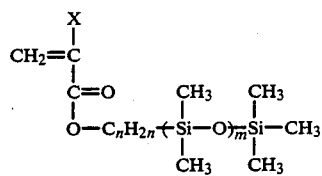 (I)

wherein X is a hydrogen atom or a methyl group; n is an integer of 2 to 4, and m signifies the average degree of polymerization and is zero or a real number.

3. An antifouling paint as in claim 1 further comprising a copolymer comprising a monomer represented by formula (I) and a copolymerizable vinyl monomer 4. An antifouling paint as in claim 1, further comprising a slipping agent.

5. An antifouling paint as claimed in claim 2, further comprising a slipping agent.

6. An antifouling paint as claimed in claim 3, further comprising a slipping agent.

* * * * *